United States Patent [19]

Finley

[11] Patent Number: 5,443,100
[45] Date of Patent: Aug. 22, 1995

[54] LOW PRESSURE AND VACUUM HOSE

[75] Inventor: Richard O. Finley, Upland, Calif.

[73] Assignee: The United Electric Company of Ohio, Burlington, N.C.

[21] Appl. No.: 274,430

[22] Filed: Jul. 13, 1994

[51] Int. Cl.⁶ .............................................. F16L 11/04
[52] U.S. Cl. .................... 138/154; 138/122; 138/129; 138/136
[58] Field of Search ............. 138/154, 122, 129, 134, 138/135, 136, 162, 166

[56] References Cited

U.S. PATENT DOCUMENTS

| | | | |
|---|---|---|---|
| 2,154,942 | 4/1939 | Karmazin | 138/154 X |
| 3,199,541 | 8/1965 | Richitelli | 138/154 X |
| 3,542,078 | 11/1970 | Lykle | 138/129 X |
| 4,167,645 | 9/1979 | Carey | 138/129 X |
| 4,224,965 | 9/1980 | Suchor | 138/129 X |
| 4,291,728 | 9/1981 | Cothran | 138/154 X |
| 4,471,813 | 9/1984 | Cothran | 138/154 X |
| 4,719,945 | 1/1988 | Richards et al. | 138/154 |
| 4,862,924 | 9/1989 | Kanao | 138/129 X |
| 4,928,734 | 5/1990 | Richards et al. | 138/129 X |
| 4,928,735 | 5/1990 | Richards et al. | 138/129 X |

FOREIGN PATENT DOCUMENTS

| | | | |
|---|---|---|---|
| 688833 | 6/1964 | Canada | 138/109 X |
| 0051419 | 5/1982 | European Pat. Off. | 138/154 |
| 1-269786 | 10/1989 | Japan | 138/154 |
| 279036 | 2/1952 | Switzerland | 138/154 |

Primary Examiner—David A. Scherbel
Assistant Examiner—Patrick F. Brinson
Attorney, Agent, or Firm—Watson, Cole, Grindle & Watson

[57] ABSTRACT

A hose for low pressure and vacuum applications is provided by a helically wound strip of resilient material. The leading and trailing posts of the helically wound strip interlock with one another and are provided with projections which define a space for confining a bead of bonding material. The profile of the hose configuration prevents the bonding material from encroaching areas of flexation in the hose. The helically wound hose has a close pitch and exhibits good hoop strength, flexibility and bonding characteristics.

19 Claims, 1 Drawing Sheet

LOW PRESSURE AND VACUUM HOSE

FIELD OF THE INVENTION

The present invention relates to flexible hose which can be used for both low pressure and vacuum applications. More particularly, the present invention relates to a flexible hose having a cylindrical configuration and comprising a helically wound convoluted strip of flexible material.

BACKGROUND OF THE INVENTION

Hoses comprising a helically wound strip of convoluted material are known from U.S. Pat. Nos. 3,542,078; 4,167,645; and 4,224,965. Each of these references discloses a hose made by helically or spirally winding a strip of flexible material having a leading edge and a trailing edge such that the leading edge fits into a recess adjacent the trailing edge and the trailing edge fits into a recess adjacent the leading edge to form a convoluted structure. The helically wound strip results in a cylindrical configuration. Usually, an amount of adhesive material is used to bond the leading and trailing edge to each other so that the hose will not leak air or other fluid traveling through the hose.

The above-described hose construction is known as "spiral wound". Other constructions include pressure formed hoses. Spiral wound hoses exhibit certain benefits over pressure formed hoses, particularly by providing areas for flexation and areas for abrasion. Unfortunately, spiral wound hoses have exhibited problems in their manufacture and design. In particular, hoop strength, flexibility and bonding are all important features in a hose with a wide variety of applications. Unfortunately, a desirable balance between each of these characteristics has been difficult to achieve.

Hoop strength is determined by the rigidity of the material and the number of posts per foot extending radially from the centerline of the hose. The posts include any radially extending leading edge of the strip, any radially extending trailing edge of the strip, and any radially extending center walls of the strip. Because of limitations in machinery, bonding area, and product design, a desirable number of posts per foot has been difficult to achieve. Double construction hoses comprising two profiles of different materials have been developed to increase hoop strength. This double construction is costly, however, due to the fact that two strips must be extruded instead of one, and two profiles must be simultaneously wound.

Flexibility is determined by material type and flex of the profile design. Flexibility and hoop strength have always been inversely related to one another. Hoses with good hoop strength have exhibited poor flexibility, and vice versa. Hoses with a close pitch typically have good flexibility. However, in a hose with a close pitch it is difficult to control the weld position where adhesive or bonding material is applied.

Bonding of the leading and trailing portions of the profile has also been a problem with spiral wound hoses. The bonding material must stick to adjacent sides of the leading and trailing profile portions with enough adhesion to prevent peeling under conditions of stress during use. The bond must also be strong enough to resist separation due to temperature. To provide these features a large amount of weld has typically been used. A large amount of weld overcomes the peeling problem but generally flows into the flexation areas of the configuration and adversely limits the flexibility of the hose.

A need therefore exists for a hose construction having a cylindrical configuration and exhibiting good hoop strength, flexibility and bonding.

SUMMARY OF THE INVENTION

The present invention relates to a hose design that overcomes the above-mentioned problems of the prior art. In particular, it is an object of the present invention to provide a strip of material having a profile which can be helically wound such that a leading and trailing edge of the strip interlock with one another to confine an amount of bonding material therebetween and form a spiral wound hose.

It is further an object of the present invention to provide a spiral wound hose having a close pitch and which exhibits good hoop strength, flexibility and bonding characteristics.

It is also an object of the present invention to provide a spiral wound hose which can be used for both low pressure and vacuum applications.

According to the present invention, the leading and trailing posts of a helically wound strip of material interlock with one another and are provided with projections for defining a confined space for isolating a bead of bonding material to bond the posts together. The profile of the hose configuration of the present invention also prevents the bonding material from encroaching flexation areas of the hose.

BRIEF DESCRIPTION OF THE DRAWINGS

The invention may be more fully understood with reference to the accompanying drawings wherein.

Figure 1:
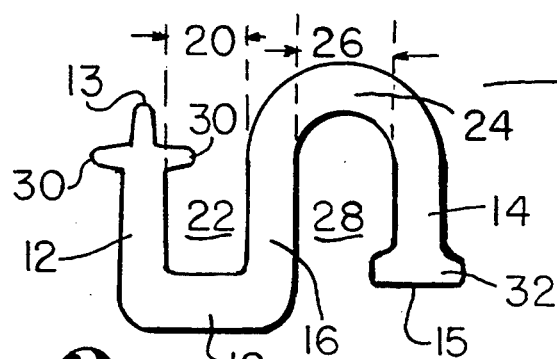
FIG. 1 is a cross-sectional view of one embodiment of the strip of material which is helically wound to form a hose according to the present invention.

The invention is not limited to the exemplary embodiments shown in the drawings but should be recognized as contemplating all modifications within the skill of an ordinary artisan.

DETAILED DESCRIPTION OF THE INVENTION

The flexible hose of the present invention has a generally cylindrical configuration. The hose comprises a helically wound convoluted strip of flexible material. At one edge of the strip an outwardly extending wall is formed. At an opposite edge of the strip an inwardly extending wall is formed. An intermediate wall is connected to the outwardly extending wall by a web portion which spaces the outwardly extending wall and the intermediate wall from one another and forms an outwardly opening recess for receiving the inwardly extending wall. The intermediate wall is connected to the inwardly extending wall by a curved crown portion which spaces the inwardly extending wall and the intermediate wall from one another and forms an inwardly opening recess for receiving the outwardly extending wall. The pitch of the hose can be measured by determining the distance between a point on the top of two adjacent curved crown portions.

The outwardly extending wall is provided with projection means extending laterally therefrom. The inwardly extending wall is provided with projection means extending laterally therefrom. The projection means on the inwardly and outwardly extending walls define with the associated inwardly and outwardly extending walls a space containing a bonding material which bonds the inwardly and outwardly extending walls to one another.

Because of the profile design, the number of posts supporting hoop strength can be increased to near ideal. The profile design makes it possible to confine bonding material and control pitch by holding separation between profiles. The hoop strength is great due to the increased number of radially extending posts per foot of hose. This construction provides a hoop strength which approaches that of the double construction hose of the prior art discussed above, without the added costs of a second extrusion process and a more complicated winding process when compared to winding a single strip.

The hose of the present invention can also be designed with a very close pitch. As such, the flexation area of the hose can be greatly increased by the added number of pitches per foot. In addition to the increased area of flexation, the bonding material is confined by the laterally extending projections, thus preventing bonding material from encroaching into the flexation areas. Confining the bonding material also ensures that the change in cross-sectional area of the profile when its edges are bonded to one another is at an advantageous location to promote maximum flexibility in the hose. With a maximized flexation area, the hose of the present invention can be made with a stiffer material without significantly affecting the flexibility of the hose. Stiffer materials can also be used to increase the hoop strength of the hose.

Preferably, the hose is made of a plastic material. Materials having good resiliency and flexibility are preferred. Some exemplary plastics which may be used include, but are not limited to, polyethylenes, polypropylenes, polybutylenes, polystyrenes and polyvinylchlorides. Polyethylenes, polypropylenes and polybutylenes are preferred according to some embodiments of the present invention. In one particularly preferred embodiment polyethylene is used as the hose material.

The bonding material is usually a melted plastic which is applied in a molten state, as opposed to an adhesive such as room temperature glues, contact cement, cyanurates, and others. The bonding material is referred to as welding material if applied in a molten state which "welds" adjacent surfaces to each other as it cools. In some preferred embodiments, the bonding material is identical to the hose material or at least from the same family of polymers. According to one preferred embodiment, a polyethylene hose material is welded by a polyethylene welding material applied as a hot melt within the confined space defined by the adjacent walls and projections. Differing polyethylenes may be used as the two materials, for example, having different chain lengths and/or physical properties although using the same materials for both s preferred.

The weld material should be applied during winding of the extruded hose profile. The weld material should be in a molten state and should be applied at a temperature which is hot enough to melt a portion of the hose profile material.

The projections on the inwardly and outwardly extending walls enable a confined space into which a precise amount of bond or weld calculated with Just the right amount of heat volume to insure proper bonding of adjacent posts and walls without the bond or weld material encroaching into the areas of flexation. The interlock of the walls and projections relieves the stress on the bond by moving the shear stress from the bonding material to the projections. This allows the hose to be constructed with an exact amount of bonding or welding material to promote adhesion between the profiles while at the same time minimizing costs of bond or weld material and increasing hose structure integrity.

The projections and overall design also prevent the profile bonding posts from spreading apart when the bond or weld material is introduced. The design enables compressive forces between bonding surfaces to be maximized and controls the cross-sectional area of the bonded or welded section. The design results in a better adhesion and better fit.

Other advantages include support for the crown portions which promotes additional hoop strength without affecting flexation, and support of the web portions to promote a smoother interior without affecting flexation.

Figure 2:
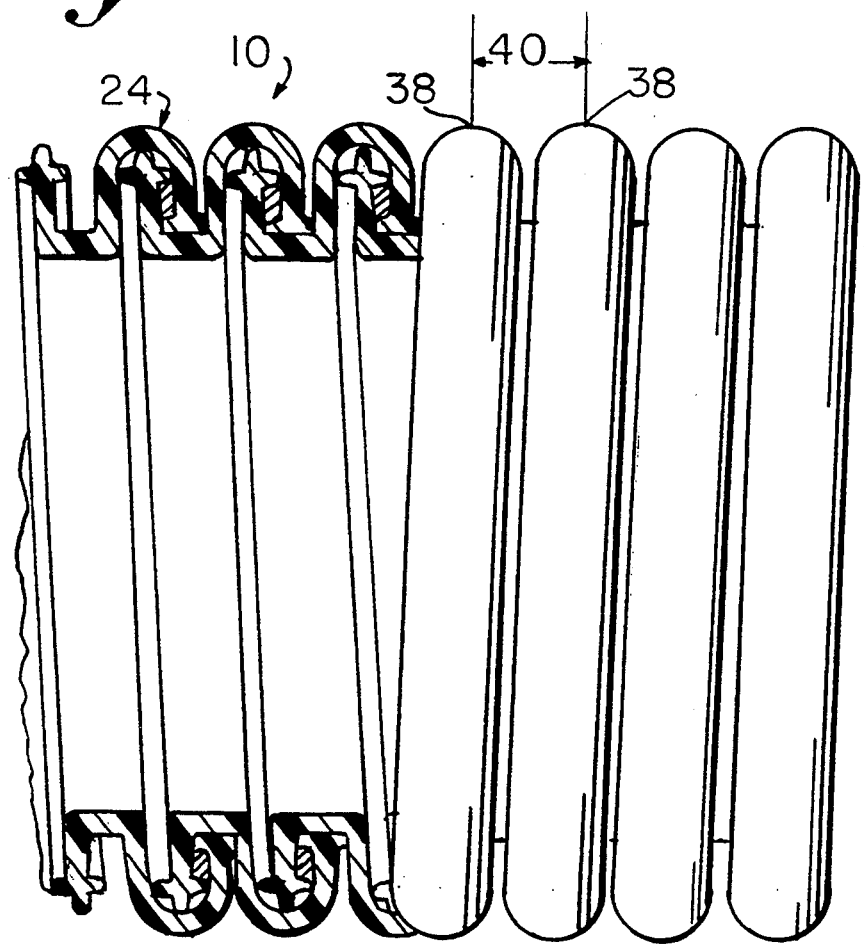
FIG. 2 is a partial cutaway view of a section of hose according to the present invention.
Figure 3:
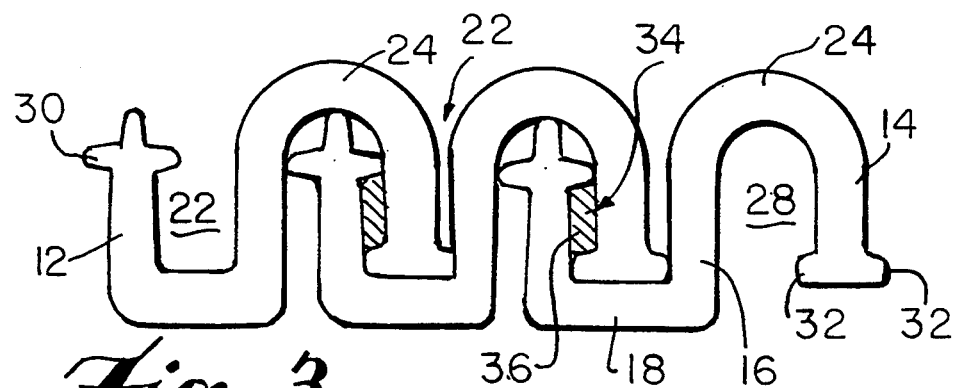
FIG. 3 is an enlarged cross-sectional view of a portion of the hose section shown in FIG. 2.

One particular embodiment of the present invention is shown in FIGS. 1–3. A flexible hose 10 having a cylindrical configuration comprises a helically wound strip of material having a cross-section as shown in FIG. 1. The strip has an outwardly extending wall 12 formed at one edge of the strip. In inwardly extending wall 14 is formed at the opposite edge of the strip. An intermediate wall 16 is connected to the outwardly extending wall 12 by a web portion 18 to space the outwardly extending wall 12 and the intermediate wall 16 from one another a distance 20 extending longitudinally of the hose. The centerline of the hose is identified by reference numeral 50 in FIG. 2. The intermediate wall 16, web portion 18 and outwardly extending wall 12 together form an outwardly opening recess 22 for receiving the inwardly extending wall 14.

The intermediate wall 16 is connected to the inwardly extending wall 14 by a curved crown portion 24 which spaces the inwardly extending wall 14 and the intermediate wall 16 from one another a distance 26 extending longitudinally of the hose. The intermediate wall 16, curved crown portion 24 and inwardly extending wall 14 together form an inwardly opening recess 28 for receiving the outwardly extending wall 12. FIG. 2 shows that the pitch of the hose can be measured by determining the distance 40 between a center point 38 on two adjacent curved crown portions 24.

The outwardly extending wall 12 has projections 30 extending laterally therefrom to define with the outwardly extending wall a lateral dimension which is substantially equal to the distance between the inwardly extending wall and the intermediate wall. The inwardly extending wall 14 has projections 32 extending laterally therefrom to define with the outwardly extending wall a lateral dimension which is substantially equal to the distance between the inwardly extending wall and the intermediate wall.

The projections 30 and 32 define with the associated inwardly and outwardly extending walls a space 34. Either simultaneously with extruding or winding, a bonding material 36 is applied to fill the space 34 and remain within the confines of the space without encroaching flexation areas in the spiral wound configuration.

As shown in FIGS. 1–3, the projections 30 are preferably spaced from the distal end 12 of the outwardly extending wall 12. The projections 30 may also be at the distal end of the outwardly extending wall 12 (not shown). If the projections 30 are spaced from the distal end 13, they are preferably spaced at a distance from the distal end which is equal to the distance the projections extend laterally from the outwardly extending wall, as shown in FIGS. 1-3. This spacing provides significant support to the curved crown portion 24. The projection means 30 preferably extend perpendicularly from the outwardly extending wall 12.

The projections 32 are preferably located at the distal end 15 of the inwardly extending wall 14 as shown in FIGS. 1-3. This arrangement provides significant support for the web portion 18 of the profile. The projection means 32 preferably extend perpendicularly from the inwardly extending wall 14.

Preferably, the outwardly extending wall, the intermediate wall, and the inwardly extending wall each extend radially from a centerline of the hose. The walls are preferably parallel with each other and the intermediate wall is preferably spaced an equal distance from both the outwardly extending wall and the inwardly extending wall.

The web portion preferably extends perpendicularly relative to both the outwardly extending wall and the intermediate wall when viewing a cross-section of the hose, as in FIG. 3.

Although the present invention has been described in connection with preferred embodiments, it will be appreciated by those of skill in the art that additions, modifications, substitutions and deletions not specifically described may be made without departing from the spirit and scope of the invention defined in the appended claims.

What is claimed is:

1. A length of flexible hose having a cylindrical configuration, said hose comprising a single helically wound convoluted strip of flexible material wound upon itself, an outwardly extending wall formed at one edge of the strip and an inwardly extending wall formed at the opposite edge of the strip, an intermediate wall connected to said outwardly extending wall by a web portion to space said outwardly extending wall and said intermediate wall from one another and forming an outwardly opening recess for receiving said inwardly extending wall, said intermediate wall being connected to said inwardly extending wall by a curved crown portion to space said inwardly extending wall and said intermediate wall from one another and forming an inwardly opening recess for receiving said outwardly extending wall, said outwardly extending wall having projection means extending laterally therefrom and engaging an adjacent inwardly extending wall, said inwardly extending wall having projection means extending laterally therefrom and engaging an adjacent outwardly extending wall, all portions of the projection means on said outwardly extending wall being spaced outwardly of the adjacent portions of the projection means on said inwardly extending wall in a direction radially of the cylindrical hose to define a space bounded by said outwardly extending wall, said inwardly extending wall, the projection means on said outwardly extending wall and the projection means on said inwardly extending wall, said space containing a bonding material which bonds the inwardly and outwardly extending walls to one another.

2. A flexible hose as defined in claim 1, wherein said flexible material comprises a plastic material.

3. A flexible hose as defined in claim 1, wherein said flexible material comprises polyethylene.

4. A flexible hose as defined in claim 1, wherein said bonding material comprises polyethylene.

5. A flexible hose as defined in claim 1, wherein said flexible material and said bonding material comprise polyethylene.

6. A flexible hose as defined in claim 1, wherein the projection means extending laterally from said outwardly extending wall extend perpendicularly therefrom.

7. A flexible hose as defined in claim 1, wherein the projection means extending laterally from said inwardly extending wall extend perpendicularly therefrom.

8. A flexible hose as defined in claim 1, wherein the projection means extending laterally from said outwardly extending wall are spaced from the distal end of said outwardly extending wall.

9. A flexible hose as defined in claim 1, wherein the projection means extending laterally from said outwardly extending wall extend therefrom a first distance and are spaced from the distal end of said outwardly extending wall a second distance which is equal to said first distance.

10. A flexible hose as defined in claim 1, wherein the projection means extending laterally from said inwardly extending wall extend from the distal end of said inwardly extending wall.

11. A length of flexible hose having a cylindrical configuration, said hose comprising a single helically wound convoluted strip of flexible material wound upon itself, an outwardly extending wall formed at one edge of the strip and an inwardly extending wall formed at the opposite edge of the strip, an intermediate wall connected to said outwardly extending wall by a web portion to space said outwardly extending wall and said intermediate wall from one another a first distance extending longitudinally of the hose and forming an outwardly opening recess for receiving said inwardly extending wall, said intermediate wall being connected to said inwardly extending wall by a curved crown portion to space said inwardly extending wall and said intermediate wall from one another a second distance extending longitudinally of the hose and forming an inwardly opening recess for receiving said outwardly extending wall, said outwardly extending wall having first projection means extending laterally therefrom and engaging an adjacent inwardly extending wall to define with said outwardly extending wall a lateral dimension substantially equal to said second distance, said inwardly extending wall having second projection means extending laterally therefrom and engaging an adjacent outwardly extending wall to define with said inwardly extending wall a lateral dimension substantially equal to said first distance, all portions of said first projection means on said outwardly extending wall being spaced outwardly of the adjacent portions of the second projection means on said inwardly extending wall in a direction radially of the cylindrical hose to define a space bounded by said outwardly extending wall, said inwardly extending wall, said first projection means and said second projection means, said space containing a bonding material which bonds the inwardly and outwardly extending walls to one another.

12. A flexible hose as defined in claim 11, wherein said first and second distances are equal to one another.

13. A flexible hose as defined in claim 11, wherein first projection means extends perpendicularly from said outwardly extending wall.

14. A flexible hose as defined in claim 11, wherein second projection means extends perpendicularly from said inwardly extending wall.

15. A flexible hose as defined in claim 11, wherein said outwardly extending wall has opposite substantially parallel faces and said first projection means extend laterally from both faces of said outwardly extending wall.

16. A flexible hose as defined in claim 11, wherein said inwardly extending wall has opposite substantially parallel faces and said second projection means extend laterally from both faces of said inwardly extending wall.

17. A length of flexible hose having a cylindrical configuration, said hose comprising a single helically wound convoluted strip of flexible material wound upon itself, an outwardly extending wall formed at one edge of the strip and an inwardly extending wall formed at the opposite edge of the strip, an intermediate wall connected to said outwardly extending wall by a web portion to space said outwardly extending wall and said intermediate wall from one another a first distance extending longitudinally of the hose and forming an outwardly opening recess for receiving said inwardly extending wall, said intermediate wall being connected to said inwardly extending wall by a curved crown portion to space said inwardly extending wall and said intermediate wall from one another a second distance extending longitudinally of the hose and forming an inwardly opening recess for receiving said outwardly extending wall, said outwardly extending wall having first projection means extending laterally therefrom to define with said outwardly extending wall a lateral dimension substantially equal to said second distance, said inwardly extending wall having second projection means extending laterally therefrom to define with said inwardly extending wall a lateral dimension substantially equal to said first distance, said projection means on said inwardly and outwardly extending walls defining with the associated inwardly and outwardly extending walls a space containing a bonding material which bonds the inwardly and outwardly extending walls to one another wherein said outwardly extending wall has opposite substantially parallel faces and said first projection means extends laterally from both faces of said outwardly extending wall, and wherein said outwardly extending wall has a first edge connected to said web portion, and a second opposite edge, said first projection means being spaced a third distance from said second edge.

18. A flexible hose as defined in claim 17, wherein said first projection means extend a fourth distance from each face of said outwardly extending wall and said third distance is equal to said fourth distance.

19. A flexible hose as defined in claim 16, wherein said second projection means extend an equal distance from each face of said inwardly extending wall.

* * * * *